United States Patent [19]
Couchois et al.

[11] 3,819,234
[45] June 25, 1974

[54] TRAILER SWAY CONTROL SYSTEM

[75] Inventors: William J. Couchois, Plymouth; Roger E. Doerfler, Detroit, both of Mich.

[73] Assignee: Kelsey-Hayes Company, Romulus, Mich.

[22] Filed: Mar. 6, 1972

[21] Appl. No.: 231,976

[52] U.S. Cl.......................... 303/20, 180/103, 303/7
[51] Int. Cl................................................ B60t 7/20
[58] Field of Search........................... 180/103–104; 200/61.46, 80 R, 80 A; 303/7, 20

[56] References Cited
UNITED STATES PATENTS

| 3,053,348 | 9/1962 | Stair | 180/103 UX |
| 3,193,746 | 7/1965 | Neyhouse | 200/80 A X |
| 3,270,317 | 8/1966 | Edelblut | 200/80 R X |
| 3,288,240 | 11/1966 | Franzel | 180/103 UX |
| 3,398,991 | 8/1968 | Compton | 180/104 X |
| 3,566,987 | 3/1971 | Franzel | 180/103 |
| 3,758,165 | 9/1973 | Savelli | 303/20 |

Primary Examiner—Milton Buchler
Assistant Examiner—Stephen G. Kunin
Attorney, Agent, or Firm—Harness, Dickey & Pierce

[57] ABSTRACT

A system for detecting the occurrence of an incipient, excessive sway condition of a trailer and for automatically applying the trailer brakes to inhibit and/or correct the sway condition.

31 Claims, 6 Drawing Figures

PATENTED JUN 25 1974
3,819,234
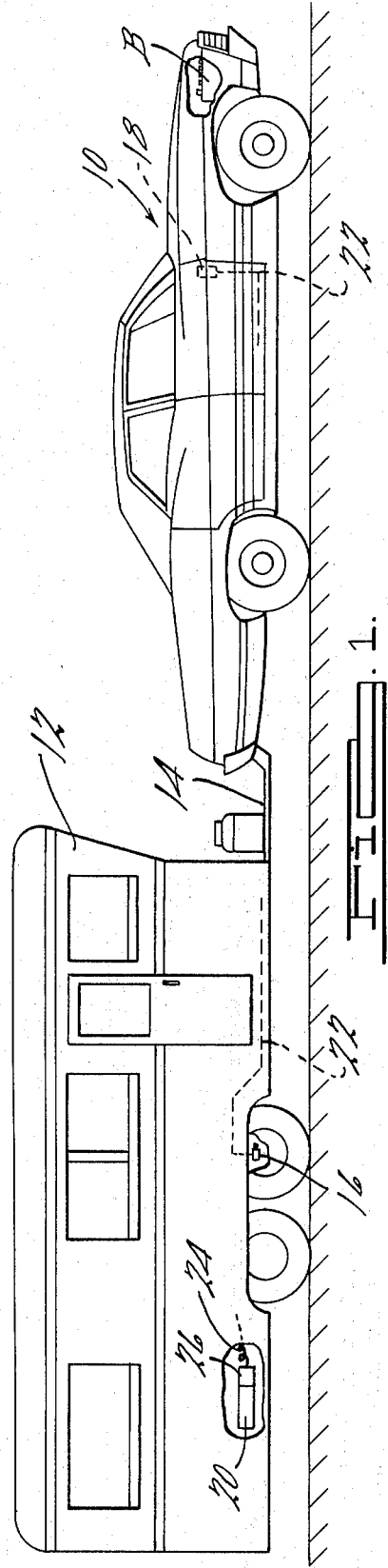
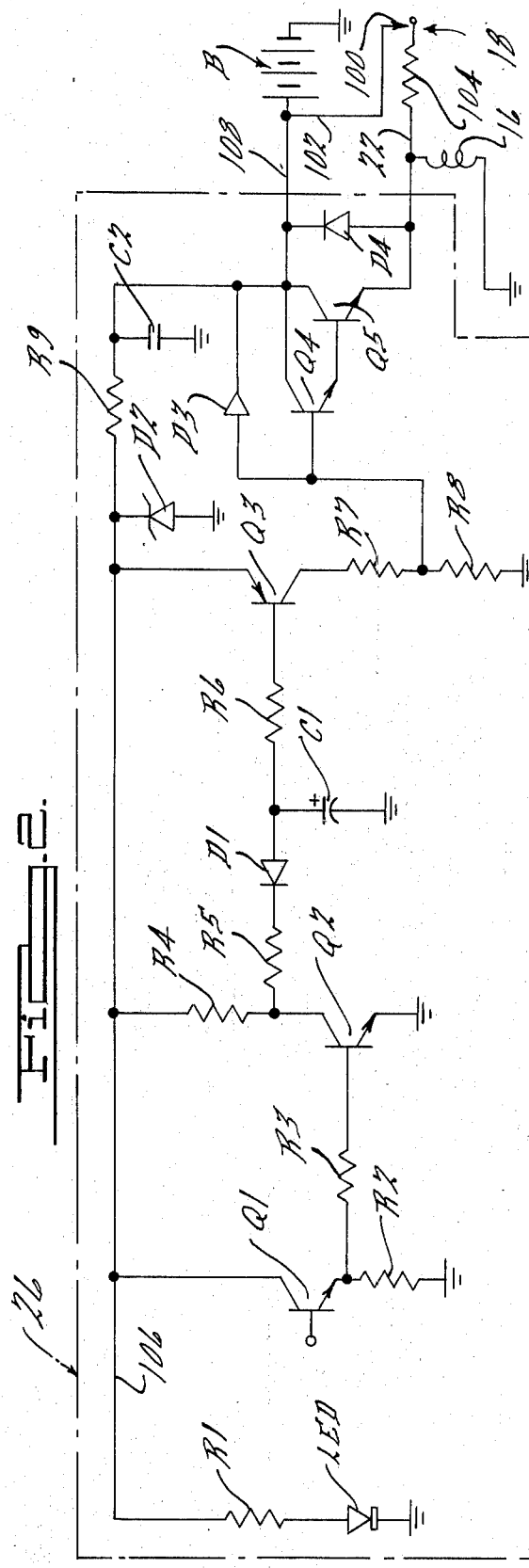

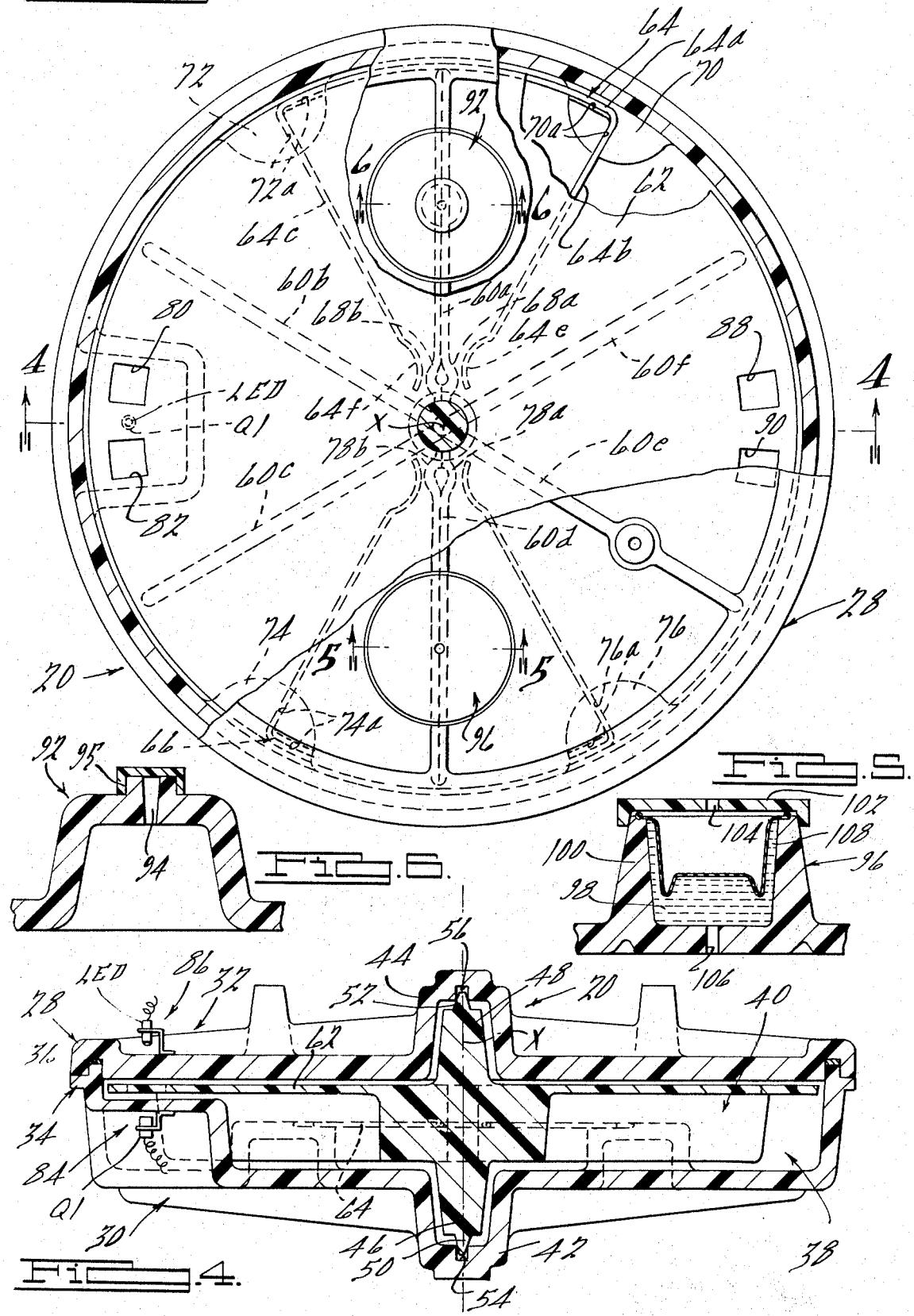

3,819,234

TRAILER SWAY CONTROL SYSTEM

SUMMARY — BACKGROUND OF THE INVENTION

The present invention relates to trailer braking systems and more particularly to a trailer braking system in which the occurrence of an incipient, excessive sway condition is detected and automatically inhibited and/or corrected.

With articulated vehicles such as tractor trailers or car towed trailers there can occur under certain circumstances a condition in which the trailer will sway or rotatably oscillate about the hitch connection relative to the towing vehicle. If this sway or oscillating condition becomes excessive, control of the towing vehicle can be impaired and a generally hazardous driving condition can be created. In the present invention the rotational or angular acceleration of the trailer is sensed and when it reaches a preselected magnitude indicative of an incipient, excessive sway condition the brakes are automatically actuated. This will result in tensioning of the hitch connection and the trailer being pulled by the towing vehicle such as to minimize any tendency to sway. By sensing angular acceleration instead of displacement corrective action can be initiated before excessive displacement occurs and hence closer control can be provided. Note also that the system senses and responds to angular acceleration and not linear acceleration of the trailer in a direction transverse to the direction of travel of the trailer. Since the construction of the present invention is not responsive to linear acceleration, it is not curve sensitive.

Therefore, it is an object of the present invention to provide a system for inhibiting and/or preventing excessive sway for a trailer; it is another object of the present invention to provide a sway inhibiting system for a trailer which system is operative in response to angular acceleration. It is another general object of the present invention to provide a novel sway control system for articulated vehicles and more particularly for trailers.

Other objects, features, and advantages of the present invention will become apparent from the subsequent description and the appended claims, taken in conjunction with the accompanying drawings, in which:

FIG. 1 is a pictorial view of a towing vehicle and a trailer embodying features of the present invention;

FIG. 2 is a circuit diagram of the electrical control circuit of the present invention.

FIG. 3 is a top elevational view with some parts shown broken away, of apparatus for detecting angular acceleration; and FIGS. 4, 5 and 6 are sectional views taken generally along the lines 4—4, 5—5, and 6—6 of FIG. 3.

Looking now to FIG. 1 a towing vehicle 10 is shown connected to a trailer 12 via an articulated linkage or hitch 14. The vehicle 10 can be provided with conventional hydraulically actuated brakes (not shown) while the trailer 12 has conventional electrically energized brakes actuated electromagnetically via a coil 16 in a puck assembly. The coil 16 can be energized via a brake controller 18 mounted in the towing vehicle 10 which is actuated in response to the actuation of the hydraulic system of vehicle 10. The controller 18 can be of a well known type such as that shown and described in U.S. Pat. to Ross No. 2,829,225 issued Apr. 1, 1958, while the electric brake assembly can be of the type shown and described in the U.S. Pat. to Birge, No. 3,134,463, issued May 26, 1964. The coil 16 is energized via battery B of vehicle 10 and via conductor 22. A sensor assembly 20 is mounted to the trailer 12 at a convenient location and senses the angular acceleration of trailer 12. The sensor assembly 20 is connected with an electric control circuit 26 which in turn is electrically connected to the brake coil 16 via conductor 24. As will be seen, the electronic control circuit 26 functions such as to energize the brake coil 16 to apply the brakes in response to detection by sensor assembly 20 of a magnitude of angular acceleration indicative of an incipient, excessive sway condition.

Looking now to FIGS. 3 and 4, the sensor 20 includes a housing assembly 28 which comprises a generally dished bottom or base plate 30 and a cover 32. The cover 32 and plate 30 are connected together via an annular tongue and groove structure 34 with this connection being sealed via an annular seal 36. The cover 32 and base plate 30 as assembled define an enclosed volume 38 in which a disk 40 is rotatably supported. The plate 30 and cover 32 have oppositely extending bosses 42 and 44, respectively, which receive oppositely extending rod portions 46 and 48 respectively. Rod portions 46 and 48 terminate in reduced diameter support portions 50 and 52, respectively, which are rotatably supported in openings 54 and 56, respectively, located near the ends of bosses 42 and 44, respectively.

The disk 40 includes a plurality of radially extending ribs $60a - 60f$ which depend from a flat base 62. The volume 38 is filled with a liquid. The sensor 20 can be located at any convenient location on the trailer 12 with the rotational axis X of the disk 40 extending vertically. When the trailer 12 begins to pivot about the hitch 14, the housing assembly 28 will remain fixed to and move or pivot with the trailer 12. The liquid in volume 38, however, will tend to maintain its original position resulting in relative rotation between housing assembly 28 and the liquid which will in turn result in a force being applied to the disk 40 via the ribs $60a - 60f$. Relative rotation of the disk 40, however, will be resiliently resisted by a pair of wire spring members 64 and 66. The spring members 64 and 66 can be made of relatively small diameter tempered, phosphor bronze wire, e.g., 0.026 inch diameter. The spring 64 is generally triangularly shaped and has an arcuate base 64a and a pair of generally straight legs 64b and 64c. The legs 64b and 64c are separated and spaced at the apex of the triangle and as such straddle the rib 60a. The legs 64 b and 64c terminate in arcuate end portions 64e and 64f which curve convexly relative to the rib 60a. Rib 60a has enlarged, outwardly arcuate portions 68b and 68c located near the center or hub of the disk 40. As the disk 40 rotates about its X axis one of the portions 68a or 68b will engage the portion 64e or 64f depending upon the direction of rotation. By providing engagement between the associated arcuate surfaces, point contact will be obtained resulting in minimizing frictional losses at this contact area. The spring 66 is identical to spring 64 with components $66a - 66f$ being similar to components $64a - 64f$; likewise, rib 60d is identical to rib 60a and has arcuate portions 78a and 78b similar to portions 68a and 68b.

The base plate 30 includes a pair of support and retaining pads 70 and 72 for supporting and retaining the spring 64 and a pair of retaining pads 74 and 76 for supporting and retaining the spring 66. The pads 70 and 72 are circumferentially spaced apart and are located diametrically opposite pads 74 and 76 which are similarly circumferentially spaced. Each of the pads 70 – 76 is formed with an angulated groove 70a through 76a, respectively, adapted to receive one corner of the associated spring 64 or 66. The spring 64 and 66 can be permanently secured to the pads 70 – 76 within the grooves 70a – 76a by staking, gluing, etc.

The cover 32 and bottom or base plate 30 are both made of a transparent plastic such as a polycarbonate while the disk 40 is made of an opaque plastic such as polyphenylene oxide. The disk 40 is provided with a pair of circumferentially spaced window openings 80 and 82 which are located to be normally axially in line with an inwardly depressed lower window portion 84 formed at the radially outer end of the cover 32. Another set of window openings 88 and 90 are located diametrically opposite windows 80 and 82 and provide a means for statically and dynamically balancing windows 80 and 82 and in fact can be used alternatively in place of windows 80 and 82.

A light emitting diode LED is supported on the cover 32 in a position normally located between the window openings 80 and 82. A photo resistive member Q1 is supported on the bottom plate 30 in a position normally located between windows 80 and 82. The LED and member Q1 are located in confrontation with window portions 86 and 84, respectively, i.e. of cover 32 and base plate 30. Thus normally light transmitted by the LED will be blocked from Q1 by the opaque disk 40. Q1, of course, is mounted sufficiently proximate to the window portion 84 and is adequately shielded such as to block out light from sources other than the LED.

As the disk 40 rotates relatively to the housing assembly 28 one of the windows 80 or 82, depending upon the direction of rotation, will be moved in line with the LED and Q1 permitting light from the LED to be received by Q1. This will provide a signal in response to which the brakes will be applied. The degree of rotation and magnitude of angular acceleration required to provide this degree of rotation in order to provide the actuating signal is selected and set in a manner to be described.

The volume 38 of housing assembly 28 is filled with a liquid, which liquid provides the necessary mass to act upon the disk 40. In this regard the ribs 60a – 60f couple the disk 40 to the liquid; the ribs 60a – 60f also provide dampening to the motion of disk 40.

The liquid in volume 38 is preferably one which will not freeze at atmospheric temperatures. At the same time, in order to avoid unbalanced loading on the disk 40 and hence unbalanced loads on the bearing support portions 50 and 52, the liquid in volume 38 preferably has the same specific gravity as the disk 40. As noted the disk 40 is made of polyphenylene oxide which has a specific gravity of around 1.06. The liquid for volume 38 is preferably a mixture of 40 percent water and 60 percent ethylene glycol. This mixture has a specific gravity of 1.06 and in addition has the desired low freezing point.

A fill port 92 is formed in the cover 32 and is defined by an upwardly extending portion having an opening 94 for fill purposes. A removable cap 95 encloses the opening 94. An expansion chamber 96 is formed on the cover 32 and includes a cavity 98 defined by an annular wall 100 which is capped at its upper end by a cap 102 which has an opening 104 communicating with atmosphere. An opening 106 in the cover 32 communicates the cavity 98 with the volume 38 of housing assembly 28. A resilient, flexible diaphragm 108 is located in the cavity 98 and is sealingly held at the upper end of wall 100 by the cap 102 whereby the lower part of cavity 98 which fluid communicates with volume 38 is separated from the upper part which is open to atmosphere. When the volume 38 is filled via fill port 92 the lower portion of cavity 98 is also filled to expand the diaphragm 108. In this way thermal expansion and contraction can be automatically compensated by expansion chamber 96 and the fluid therein.

As previously noted the actuated signal is provided when one of the windows 80 or 82 is in line with the LED and Q1; this occurs when the disk 40 has rotated a selected amount or degree from its neutral position. Rotation of disk 40, however, is opposed by the springs 64 and 66 and hence the necessary degree of rotation of disk 40 will occur when the combined mass of the disk 40 and the mass and/or viscosity of the liquid in volume 38 acting on the disk 40 attains an angular acceleration of a great enough magnitude to result in a force sufficient to overcome the opposing force of springs 64 and 66. Thus the initiation of the actuating signal will occur in response to a determinable magnitude of angular acceleration. This magnitude of angular acceleration is selected to be indicative of the occurrence of an incipient excessive sway condition of the trailer 12 and was selected to be around 1.4 rad/sec.$^2$. The windows 80 and 82 are spaced relative to the normal or neutral relative position of the LED and Q1 such that an angular rotation of 3.5° of the disk 40, in either direction is required before Q1 can receive sufficient light from the LED through one of the windows 80 or 82 to provide the actuating signal. As will be seen the coil 16 is energized via the control circuit 26 in response to occurrence of the actuating signal from Q1 whereby the brakes will be applied.

Looking now to FIG. 2 the control circuit 26 is shown in combination with the battery B, brake controller 18, and coil 16. The battery B has one side grounded and its other side connected via conductor 102 to a movable contact arm 100 of brake controller 18. The contact arm 100 is operatively connected with the brake system of the vehicle 10 and with a resistor assembly 104 (see patent to Ross, supra) which is connected to coil 16 via conductor 22. As the brakes of vehicle 10 are applied the arm 100 is moved into engagement with resistor 104 closing a circuit to energize coil 16 whereby the electric trailer brakes will be actuated. As the arm 100 is moved further across the resistor 104 in response to increased application of brakes at the vehicle 10 the amount of resistance of 104 in series circuit with coil 16 will be decreased resulting in a corresponding increase in current to coil 16 and hence in braking of the trailer 12. For normal driving without application of the brakes of towing vehicle 10 the arm 100 will be out of contact with resistor 104 and the coil 16 will be de-energized. However, in a manner to be seen, the coil 16 will be energized by the control circuit 26 in response to the occurrence of an incipient excessive, sway condition.

The LED has one side connected to ground and its opposite side connected to a B plus voltage line 106 via a dropping resistor R1. The photoresistive member Q1 has one electrode connected to B plus line 106 and its other electrode connected to ground via a resistor R2. Q1 is a photo-resistive device which changes its resistance in accordance with the intensity of light received i.e. from LED. An n-p-n transistor Q2 has its base connected to the juncture between R2 and Q1 via a biasing resistor R3. Q2 has its emitter connected to ground and its collector connected to B plus line 106 via resistor R4. Q2 is normally non-conductive but will be rendered conductive when Q1 is actuated (resistance reduced) by the light from LED as when one of windows 80 or 82 is in line with LED and Q1 i.e. in response to an angular acceleration of the trailer 12 of around 1.4 rad/sec.$^2$ or greater.

Q2 is coupled to a p-n-p transistor Q3 and has its collector connected to the base of Q3 via a biasing resistor R5, a diode D1, and another biasing resistor R6. The diode D1 has its anode connected to R6 and its cathode connected to R5. Q3 is also normally non-conductive and has its emitter connected to B plus line 106 and its collector connected to ground via resistors R7 and R8. When Q2 is rendered conductive current can flow in the emitter-base circuit of Q3 to turn that transistor "on." A time delay is provided by a circuit including a capacitor C1 connected between the juncture of D1 and R6. The magnitude of resistance of R6 is substantially greater than that of R5 so that the charge time for C1 will be substantially greater than the discharge time. Capacitor C1 is normally fully charged and when Q2 is rendered conductive the charge on C1 will initially hold Q3 "off;" however, this is only a slight time delay since the discharge time is short. After Q2 has been rendered non-conductive emitter-base current will continue to flow in Q3 to charge C1 and hence to maintain Q3 "on." This additional "on" time is selected for a purpose to be seen.

Q3 is coupled to an n-p-n transistor Q4 which has its base connected to the juncture of resistors R7 and R8. The collector of Q4 is connected to the positive side of battery B via conductor 108 and its emitter is connected to the base of n-p-n transistor Q5. Q5 has its collector connected to positive potential of battery B via conductor 108 and has its emitter connected to the brake coil 16. Both Q4 and Q5 are normally non-conductive; Q4 will be rendered conductive when Q3 conducts and in turn will render Q5 conductive whereby the brake coil 16 will be energized.

Thus when Q1 is energized by LED, i.e. window 80 or 82 rotated in line therewith, the coil 16 will be energized since Q2, Q3, Q4, and Q5 will all be then rendered conductive. As noted the circuit of C1 provides an "on" time delay such that after Q2 is initially rendered non-conductive by the window 80 or 82 returning to neutral and out of line with Q1 and LED whereby light from LED is blocked from Q1, C1 will hold Q3 "on." This will, of course, result in Q4 and Q5 being held "on" and result in the brake coil 16 being maintained energized to hold the brakes on. The magnitude of additional "on" time is selected to assure that the trailer 12 will, in fact, return to its neutral position relative to the towing vehicle 10 and hence to prevent hunting. In one form the added "on" time was selected to be between 0.25 and 0.50 sec.

The voltage at line 106 is regulated and to this end a zener diode D2 is connected from conductor 106 to ground; a resistor R9 connects conductor 106 to the positive side of battery B via conductor 108 while a capacitor C2 is connected from conductor 108 to ground. R9 and C2 provide current limiting and filtering functions and in combination with D2 provide for a regulated potential at conductor 106.

A zener diode D3 is connected between conductor 108 and the base of Q4 and provides transient protection. A diode D4 is connected, with reverse polarity, across the emitter-collector circuit of Q5 and provides protection for Q5 as from inductive transients of coil 16.

Note that the control circuit 26, when not energized, does not affect the normal, independent operation of the trailer brakes via the brake controller 104. However, upon the occurrence of an incipient excessive sway condition, the control circuit 26 will in a sense bypass the collector 104 such that braking will be controlled by the control circuit 26 alone. In this regard, the control circuit 26 does not provide for modulated or varied actuation of the brakes but provides for either a full "on" or a full "off" condition. This simplifies the circuit design, i.e. tolerances of LED and Q1 are not critical; the voltage regulation need not be critically maintained, etc.

With many electrically actuated trailer brakes even when the coil (such as coil 16) is fully acutated the trailer brakes will not lock the wheels up. In the event a problem with a locked wheel does exist, the magnitude of current could be limited to prevent this occurrence by use of a resistor in series with the coil; in this regard a selected portion of the brake controlling winding 104 could be utilized.

While in the system disclosed and described it is contemplated that both of the brakes for wheels on opposite sides of the trailer would be simultaneously controlled by the control circuit 26, single, individual control could be provided for each wheel depending upon the direction of trailer sway.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a wheeled vehicle adapted to be towed by a towing vehicle and having a brake system actuable for braking at least one wheel of the vehicle, the invention comprising: angular acceleration sensor means for sensing the actual magnitude of angular acceleration of the towed vehicle, brake operating means operatively connected with said angular acceleration sensing means and responsive to angular acceleration of a preselected magnitude for actuating the brake for at least the one wheel of the vehicle.

2. The invention of claim 1 with said angular acceleration sensing means comprising housing means adapted to be secured to the towed vehicle, rotor means comprising a disk supported for rotation relative to said housing means, fluid means comprising a fluid located in said housing for coupling said disk and said fluid whereby the relative rotation of said disk and said housing means provides an indication of the angular acceleration of the towed vehicle, and with said brake operating means responsive to the relative rotation between said disk and said housing means for actuating the brake.

3. The invention of claim 2 with said disk comprising coupling means coupling said disk to said liquid.

4. The invention of claim 3 with said coupling means comprising a plurality of ribs fixed to said disk.

5. The invention of claim 2 further comprising resilient means connected to said housing means and said rotor means for opposing rotation of said disk relative to said housing means.

6. The invention of claim 2 with said disk being substantially immersed in said liquid and with said liquid and with said disk having generally the same specific gravity.

7. The invention of claim 6 with said liquid having a low freezing point such that it will not freeze at atmospheric temperatures.

8. The invention of claim 6 with said resilient means comprising a spring engaging said disk with a minimum contact area whereby frictional losses are minimized.

9. The invention of claim 2 with said brake operating means responsive to said disk attaining a first preselected positional relationship relative to said housing for actuating the brake and responsive to a second preselected positional relationship for deactuating the brake.

10. The invention of claim 9 with said brake operating means comprising time delay means for delaying deactuating of the brake for a preselected time duration after attainment of said second preselected positional relationship.

11. The invention of claim 9 with said first preselected positional relationship being an amount of relative rotation greater than around 3.5°.

12. The invention of claim 9 with said first preselected positional relationship being attained in response to angular acceleration of the towing vehicle of around 1.4 rad/sec.$^2$.

13. The invention of claim 12 with said first preselected positional relationship being an amount of relative rotation greater than around 3.5°.

14. The invention of claim 1 with said angular acceleration sensing means comprising an enclosed housing, a disk located within said housing and supported therein for rotation relative to said housing, a liquid substantially filling said housing and substantially surrounding said disk, means coupling said disk and said liquid whereby pivoting of the towing vehicle results in relative rotation between said disk and said housing means for providing an indication of the angular acceleration of the towed vehicle, said brake operating means responsive to the relative rotation between said disk and said housing means for actuating the brake.

15. The invention of claim 14 with said liquid and said disk having generally the same specific gravity.

16. The invention of claim 15 with said liquid having a low freezing point such that it will not freeze at atmospheric temperatures.

17. The invention of claim 14 further comprising resilient means for resiliently resisting relative rotation of said disk.

18. The invention of claim 17 with said resilient means comprising a spring engaging said disk with a minimum contact area whereby frictional losses are minimized.

19. The invention of claim 1 with said preselected magnitude of angular acceleration being around 1.4 rad/sec.$^2$.

20. The invention of claim 1 with said brake operating means actuating the brake to a magnitude less than that magnitude which would provide locked wheel.

21. The invention of claim 1 with the brake being an electrically actuated brake and with said brake operating means actuating that brake by providing a preselected magnitude of current with said preselected magnitude of current being less than that which would result in a locked wheel condition.

22. In a wheeled vehicle adapted to be towed by a towing vehicle and having a brake system electrically actuable for braking at least one wheel of the vehicle, the invention comprising: an enclosed housing, a disk located within said housing and supported thereon for rotation relative to said housing a liquid substantially filling said housing and substantially surrounding said disk, means coupling said disk and said liquid whereby pivoting of the towing vehicle results in relative rotation between said disk and said housing means, resilient means connected to said housing for opposing rotation of said disk relative to said housing means whereby the magnitude of relative rotation will be a function of the magnitude of the angular acceleration of the towing vehicle, circuit means for providing an electrical output signal to actuate the brake for at least the one wheel, said circuit means comprising sensing means for sensing the relative positional relationship between said disk and said housing and for providing an indicating signal in response to said disk and said housing attaining a preselected positional relationship indicative of an incipient excessive sway condition of the towing vehicle, said circuit means comprising output circuit means for providing said output signal in response to said indicating signal.

23. The apparatus of claim 22 with said actuating signal having a magnitude less than that magnitude which would lock the brakes of the at least one wheel.

24. The apparatus of claim 23 with said coupling means comprising a plurality of ribs on said disk.

25. The apparatus of claim 22 with said resilient means comprising a spring member supported in cantilever fashion on said housing, said spring member having a first convexly, arcuate portion, said disk having a second convexly arcuate portion in confrontation with said first arcuate portion, said first and second arcuate portion engageable with each other to provide a minimum contact area whereby friction therebetween is minimized.

26. The apparatus of claim 25 with said coupling means comprising a plurality of ribs on said disks, said resilient means comprising a triangularly shaped wire member open at its apex and straddling one of said ribs with the base of said wire member supported on said housing and with said wire member having two legs like said spring member on opposite sides of said one of said ribs.

27. The apparatus of claim 22 with said sensing means comprising a light emitting diode and a photoresponsive member located on opposite sides of said disk, said disk having windows in between said diode and photoresponsive member whereby relative rotation of said disk can be detected.

28. The apparatus of claim 26 with said housing having transparent window portions located in line with said windows and with said diode and said photoresponisve member located externally of said housing on opposite sides of said window portions.

29. The apparatus of claim 28 with said disk being opaque at least in the location of said windows and with said liquid being effectively transparent.

30. The apparatus of claim 22 with said output circuit means comprising time delay means for providing a preselected time delay in response to said disk and said housing moving out of said preselected positional relationship indicative of correction of said incipient sway condition.

31. The apparatus of claim 22 with said time delay being .25 and .50 second.

* * * * *